(12) United States Patent
Lin et al.

(10) Patent No.: US 11,695,894 B1
(45) Date of Patent: Jul. 4, 2023

(54) AUTOMATIC PROFILE CONTOUR ARTIFACT DETECTION

(71) Applicant: Xerox Corporation, Norwalk, CT (US)

(72) Inventors: Guo-Yau Lin, Fairport, NY (US); Eliud Robles Flores, Webster, NY (US); David R Stookey, Walworth, NY (US); Varun Sambhy, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/862,671

(22) Filed: Jul. 12, 2022

(51) Int. Cl.
*H04N 1/60* (2006.01)

(52) U.S. Cl.
CPC ......... *H04N 1/6033* (2013.01); *H04N 1/6008* (2013.01)

(58) Field of Classification Search
CPC .......................... H04N 1/6033; H04N 1/6008
See application file for complete search history.

(56) References Cited

U.S. PATENT DOCUMENTS

| | | | |
|---|---|---|---|
| 5,966,461 A | 10/1999 | Harrington | |
| 7,519,222 B2 | 4/2009 | Kisilev et al. | |
| 7,783,122 B2 | 8/2010 | Wu et al. | |
| 8,237,985 B2 | 8/2012 | Jacobs et al. | |
| 8,964,256 B2 | 2/2015 | Viturro et al. | |
| 2003/0048478 A1 | 3/2003 | Cheng et al. | |
| 2014/0254925 A1* | 9/2014 | Widener | G06V 10/44 382/165 |
| 2020/0112652 A1* | 4/2020 | Kroon | H04N 1/6022 |

* cited by examiner

*Primary Examiner* — Quang N Vo
(74) *Attorney, Agent, or Firm* — Lippes Mathias LLP (57) ABSTRACT

A system and method provide for automated evaluation of reference point pairs. For each of a set of reference point pairs in an input color space, a straight line connecting the reference points is sampled to generate a set of sampled points. Each of the set of sampled points in the input color space is converted to a sampled point in an output color space. For each of a set of color separations in the output color space, discontinuities are identified, based on the set of sampled points in the output color space. Candidate reference point pairs are identified in the set of reference point pairs for which at least one discontinuity is identified. The candidate reference point pairs can be validated by printing test sweeps, which are each derived from a respective set of sampled points in the output color space, and identifying contour artifacts in the printed test sweeps.

20 Claims, 8 Drawing Sheets

AUTOMATIC PROFILE CONTOUR ARTIFACT DETECTION

BACKGROUND

The exemplary embodiment relates to image processing and finds particular application in the prediction of locations in an output color space where contour artifacts may occur when input colors in an input color space are converted to output colors the output color space.

Contour artifacts are visible, undesirable, sharp changes in the color of a rendered image in an area that is otherwise characterized by a smooth, gradual, and consistent transition from one color to another. These artifacts may arise due to the color profiles used in converting an input image, defined in an input color space, such as sRGB or $L^*a^*b^*$, to an output (device) color space, such as CMYK. Thus, even though the input (3-dimensional color points) transition may be smooth, each of the output channel (4-dimensional device color points) may not be, and the reproduced transition (represented in $L^*a^*b^*$ space) could potentially inherit the discontinuity. To ensure color image quality, it is desirable to identify and reduce such contour artifacts. Conventional methods for contour artifact identification generally entail rendering a library of test images and using a set of trained human experts to evaluate contour artifacts visually. The results of the evaluation are then provided to a color development team for making improvements, often in an iterative process. Such manual methods for contour artifact identification tend to be costly, time consuming, and error prone. Additionally, even though the library of test images may be relatively large, a customer image may still exhibit contour artifacts if the test images are not fully representative of potential contour artifact issues.

There remains a need for a system and method which can reduce these and other problems.

INCORPORATION BY REFERENCE

The following references, the disclosures of which are incorporated herein in their entireties by reference, are mentioned:

U.S. Pat. No. 5,966,461, issued Oct. 12, 1999, entitled Reduction of false contours by chrominance modulation, by Harrington, describes a method for eliminating false contours in the luminance channel by sacrificing chrominance accuracy within printer halftones and using the reduction of chrominance to improve the luminance correctness for any requested color.

U.S. Pat. No. 7,519,222 B2, issued Apr. 14, 2009, entitled PRINT DEFECT DETECTION, by Kisilev, et al., describes an automated system to detect print defects. The method includes comparing a scanned image with a reference image, and deriving detail maps at different resolutions. Similarity measures are computed between blocks of the scanned and reference images, which are used to evaluate print defects.

U.S. Pat. No. 7,783,122 B2, issued Aug. 24, 2010, entitled BANDING AND STREAK DETECTION USING CUSTOMER DOCUMENTS, by Wu, et al., describes a method for detection of banding and streaking during printing. The method includes printing a reference image and deriving one-dimensional profiles for a captured image thereof. Differences between the one-dimensional profiles of the captured image and of the reference image are evaluated for image quality defects.

U.S. Pat. No. 8,237,985 B2, issued Aug. 7, 2012, entitled SOFTPROOFING VIA MODELING PRINT ENGINE RENDERING CHARACTERISTICS, by Jacobs, et al., describes a method for representing an image, which is to be subsequently rendered on a target print engine, on a display, taking into account specific rendering characteristics of the print engine.

U.S. Pat. No. 8,964,256, issued Feb. 24, 2015, entitled METHOD OF CORRECTING STREAKS USING EXPOSURE MODULATION AND SPATIALLY VARYING TRCS, by Viturro, et al., describes compensating for streak defects in images formed by a digital printer. Both modulation of a raster output scanner (ROS actuation) and spatially varying tone reproduction curve (STRC actuation) are used in a common control system for improving streak correction. Low spatial frequency large amplitude streak defects are corrected using ROS actuation and high spatial frequency streak defects, as well as any residual low frequency defects, are corrected using STRC actuation.

U.S. Pub. No. 20030048478A1, published Mar. 13, 2003, entitled SYSTEM AND METHOD OF PERFORMING HALFTONE GAMMA CORRECTION IN A PRINTING ENVIRONMENT, by Cheng, et al., describes a method for performing halftone gamma correction in a printing environment which reduces contouring and improves overall image print quality.

U.S. Pub. No. 20140254925A1, published Sep. 11, 2014, entitled AUTOMATED CONTOUR DETECTION METHODS, SYSTEMS AND PROCESSOR-READABLE MEDIA, by Widener, describes a method and system for identifying existence and occurrence of a contour. The contour presence can be identified by taking a second derivative of a color space (e.g., $L^*$, $a^*$, and $b^*$) value of a rendered image derived utilizing an ICC profile that models behavior of a MFD as a smoothness metric. A moving average filter can be applied to minimize an extraneous peak and trough in the second derivative that can be contributed to noise. The contour can be detected if a filtered second derivative lies outside a given range. The location of the contour can be identified by matching up an input value with corresponding input value of the image. A probability of the contour being visible in a rendered output can be then determined by separately analyzing the color space values.

BRIEF DESCRIPTION

In accordance with one aspect of the exemplary embodiment, an evaluation method includes, for each of a set of reference point pairs in an input color space, sampling a straight line connecting the reference points in the reference point pair to generate a set of sampled points, converting each of the set of sampled points in the input color space to a sampled point in an output color space, and for each of a set of color separations in the output color space, identifying discontinuities, based on the set of sampled points in the output color space. Candidate reference point pairs are identified in the set of reference point pairs for which at least one discontinuity is identified.

Some or all of the steps of the method may be implemented by a computer processor.

In accordance with another aspect, an image processing system includes a color profile reception component which receives a color profile. A reference point pair selection component selects a set of reference point pairs in an input color space. A sweep generation component, for each of the set of reference point pairs in the input color space, samples a straight line connecting the reference points in the reference point pair to generate a set of sampled points. A color profile application component applies the color profile to each of the set of sampled points in the input color space to convert the sampled point to a sampled point in an output color space. A plot generation component, for each of a set of color separations in the output color space, generates a plot of amount of colorant over a range of mixtures of the colorant. A discontinuity detection component which identifies discontinuities, based on plots. A candidate reference point pair selection component identifies candidate reference point pairs in the set of reference point pairs for which at least one discontinuity is identified. A test image generation component generates a test image, the test image including a test sweep for each of at least some of the candidate reference point pairs, each test sweep including a sequence of regions, each of the regions defining colorant values for a respective point in the sweep of points in the output color space. An output image assessment component receives color-related information for a printed image derived from the test image, the color-related information identifying contour artifacts, where present, in the printed test sweeps or providing information from which the contour artifacts are identifiable. A candidate pair validation component identifies a subset of the candidate reference point pairs as validated reference point pairs, based on the color-related information. A processor implements the components.

DETAILED DESCRIPTION

Aspects of the exemplary embodiment relate to a system and method for detection of potential contour artifacts without the need for printing a large collection of test images.

As used herein, a printer can include any device for rendering an image on print media, such as a copier, laser printer, bookmaking machine, facsimile machine, or a multifunction machine (which includes one or more functions such as scanning, printing, archiving, emailing, and faxing). "Print media" can be a usually flimsy physical sheet of paper, plastic, or other suitable physical print media substrate for images. A "print job" is normally a set of digital images to be rendered on sheets of print media. A digital image generally may include information in electronic form which is to be rendered on the print media by the printer and may include text, graphics, pictures, and the like. The information includes, for each pixel of the input image, color separation values in an input color space, which are converted to color separation values an output color space before printing. The operation of applying images to print media, for example, graphics, text, photographs, etc., is generally referred to herein as printing or marking.

The input color space generally has fewer dimensions (color separations) than the output color space. Thus, for a given color defined by color separation values in the input color space there may be several combinations of color separation values in the output color space which could be considered for converting the input color. A color profile defines a transformation (e.g., in the form of an equation or set of equations) for converting an input color to a single set of color separation values in the output color space.

A color gamut defines a subset of the colors in the output color space. These are colors that the printer is expected to be able to render. The input color space may include colors that are out of gamut in the output color space. For such input colors, the color profile maps the input color to an output color that is within the color gamut. In particular, the input color is mapped to a set of color separation values that lies on a perimeter of the output color gamut. Because of the shape of the color gamut, a straight line between two reference points in the input color space (each reference point defined by a set of color separation values) which are converted to points on the perimeter of the gamut may, in some cases, pass through intermediate points which are outside the gamut ("out-of-gamut") when converted to the output color space. Thus, while a sweep of the points in the straight line exhibits a uniform change in the input color space, the corresponding sweep in the output color space may be discontinuous, due to the mapping to the gamut perimeter produced by the color profile. As a result, contour artifacts may occur when the sweep of points is rendered by the printer. An aim of the present method is to identify pairs of reference points in the output color space for which such discontinuities are present in the sweep of points, so that these pairs of interest can be focused on in the development of a modified color profile.

As will be appreciated, the printer may include components which are capable of detection and correction of discontinuities in the output color space, allowing the printed image to include fewer contour artifacts than would be expected. Accordingly, a test pattern may be printed which includes regions corresponding to the sweep of points between a pair of reference points of interest. Visual or automated examination of the printed test pattern may be used to identify a subset of the color profile transformations as candidates for modification.

Figure 1:
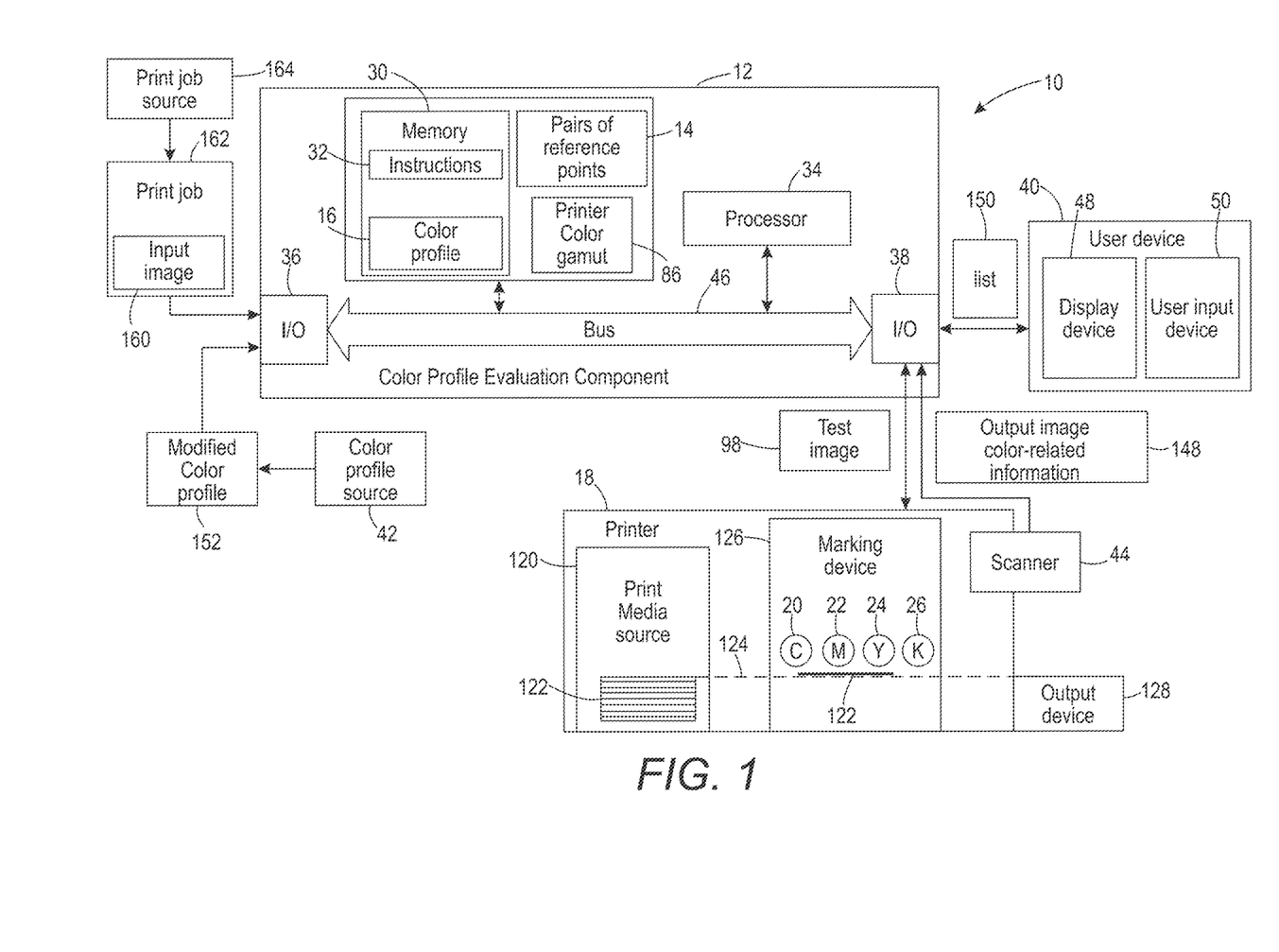
FIG. 1 is a functional block diagram of an image processing system in accordance with one aspect of the exemplary embodiment.

With reference to FIG. 1, an image processing system 10 includes a computer-implemented color profile evaluation component 12, which is configured for identifying pairs of reference points 14 as candidate reference points for use in modifying a stored color profile 16. The color profile 16 includes transformations for transforming input colors in an input color space to output colors in an output color space. The color profile 16 may be designed for use with a specific printer 18 (or with a set of nominally identical printers), using a predefined set of colorants 20, 22, 24, 26, such as inks or toners.

In one embodiment, the input color space is a device independent color space, such as device-independent RGB (sRGB), or a Luminance-Brightness color space, such as L*a*b* (e.g., CIE 1976 L*a*b*). The exemplary input color space includes only three color separations. In RGB, colors are defined by combinations of red, green, and blue. In the L*a*b* color space, L* is the luminance of the image. Values are in the range [0, 100], where 0 specifies black and 100 specifies white. As L* increases, colors become brighter. a* is the amount of red or green tones. A large positive a* value corresponds to red/magenta. A large negative a* value corresponds to green. Although there is no single range for a*, values commonly fall in the range [−100, 100] or [−128, 127]. b* is the amount of yellow or blue tones. A large positive b* value corresponds to yellow. A large negative b* value corresponds to blue. Although there is no single range for b*, values commonly fall in the range [−100, 100] or [−128, 127]. The CIE L*a*b* three-dimensional color space covers the entire range of human color perception within its gamut. As is known, equations exist for losslessly converting colors in the RGB color space to colors in the L*a*b* color space. Accordingly, while particular reference is made to the L*a*b* color space, for purposes of the following description, the RGB and L*a*b* color spaces can be considered as interchangeable. Further, other input color spaces are contemplated, such as the CIE 1976 L*, u*, v* color space, HSL (hue, separation, lightness) color space, and the like.

In one embodiment, the output color space is a device dependent color space, which may include four (or more) color separations, such as CMYK (cyan, magenta, yellow and black). Each of these colorants may be expressed on a scale of [0, 1] or [0, 100]. As will be appreciated, the printer may be limited to a maximum total colorant for a given pixel (the sum of cyan, magenta, yellow and black), which may be reflected in the color profile 16 or applied to the output color values generated by the color profile.

As illustrated in FIG. 1, the color profile evaluation component 12 includes memory 30, which stores software instructions 32 for performing the method described below, and a processor 34, in communication with the memory, for executing the instructions. Memory 30 may also store a color profile being evaluated as well as a set of identified pairs reference points 14, or otherwise have access thereto. One or more input/output devices (I/O) 36, 38 allow the evaluation component 12 to communicate with external devices, such as one or more of the illustrated printer 18, a user device 40, a source 42 of color profiles, one or more assessment components 44, and the like. Hardware components 30, 34, 36, 38 of the evaluation component 12 may communicate via a data/control bus 46.

The evaluation component 12 may include one or more computing devices, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 30 may represent any type of non-transitory computer readable medium such as random access memory (RAM), read only memory (ROM), magnetic disk or tape, optical disk, flash memory, or holographic memory. In one embodiment, the memory 30 comprises a combination of random access memory and read only memory. In some embodiments, the processor 34 and memory 30 may be combined in a single chip.

The interface 36, 38 allows the computer to communicate with other devices via wires or wireless connections, such as a computer network, e.g., a local area network (LAN) or wide area network (WAN), or the internet, and may comprise a modulator/demodulator (MODEM) a router, a cable, and/or Ethernet port.

The digital processor device 34 can be variously embodied, such as by a single-core processor, a dual-core processor (or more generally by a multiple-core processor), a digital processor and cooperating math coprocessor, a digital controller, or the like. The digital processor 34, in addition to executing instructions 32 may also control the operation of other components of the system 10, such as the printer 18.

The user device 40 may include a display device 48, for displaying information to users, speakers, and a user input device 50, such as a keyboard or touch or writable screen, and/or a cursor control device, such as mouse, trackball, or the like, for inputting text and for communicating user input information and command selections to the processor device 34. The user device 40 may be a stand-alone computing device, or may rely on the processor and memory of the evaluation component 12.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
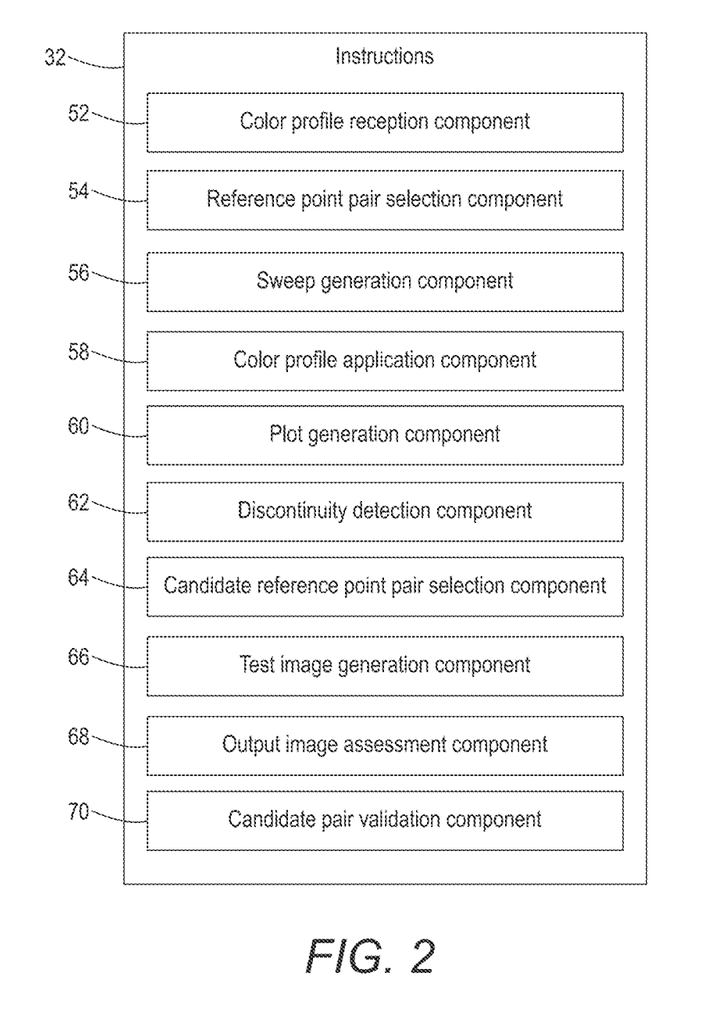
FIG. 2 illustrates an exemplary evaluation component for use in the system of FIG. 1.

As illustrated in FIG. 2, the instructions 32 may include a set of software components for performing the method. These may be separate or combined. The illustrated components include a color profile reception component 52, a reference point pair selection component 54, a sweep generation component 56, a color profile application component 58, a plot generation component 60, a discontinuity detection component 62, a candidate reference pair selection component 64, a test image generation component 66, an output image assessment component 68, and a candidate pair validation component 70.

The color profile reception component 52 receives as input a color profile 16 and stores the profile in memory. The color profile 16 may be specific to the printer 18, to a class of printers, or may have been previously generated for a different printer, or may be one which is initialized with predicted transformations.

The reference point selection component 54 selects a pair of reference points in the input color space. For example, in the L*a*b* space, the two reference points are each expressed as a vector, denoted $Lab_1=(L^*_1, a^*_1, b^*_1)$ and $Lab_2=(L^*_2, a^*_2, b^*_2)$, respectively, where at least one of $L^*_1$, $a^*_1$, and $b^*_1$ differs from the respective value of $L^*_2$, $a^*_2$, and $b^*_2$. The selection of the two reference points is repeated a large number m of times. For example, at least 1000 or at least 1,000,000, or at least 1,000,000,000 reference point pairs are selected with the aim of covering the output color space (e.g., CMYK). Each pair of reference points may be selected arbitrarily or sequentially. In one embodiment, for some or all of the pairs of reference points, both points lie on the perimeter of the gamut in the corresponding output space.

If there are some regions of the L*a*b* space where contour artifacts are expected to occur in the corresponding output space, the selection of pairs of reference points may focus on those areas. For example, to cover historical problematic colors, a set of predetermined L*a*b* pairs which are known to exhibit contour artifacts may be stored. This predetermined set may accumulate over time based on the previous contouring detection results. At least some of the reference pairs may be selected from this set.

Figure 3:
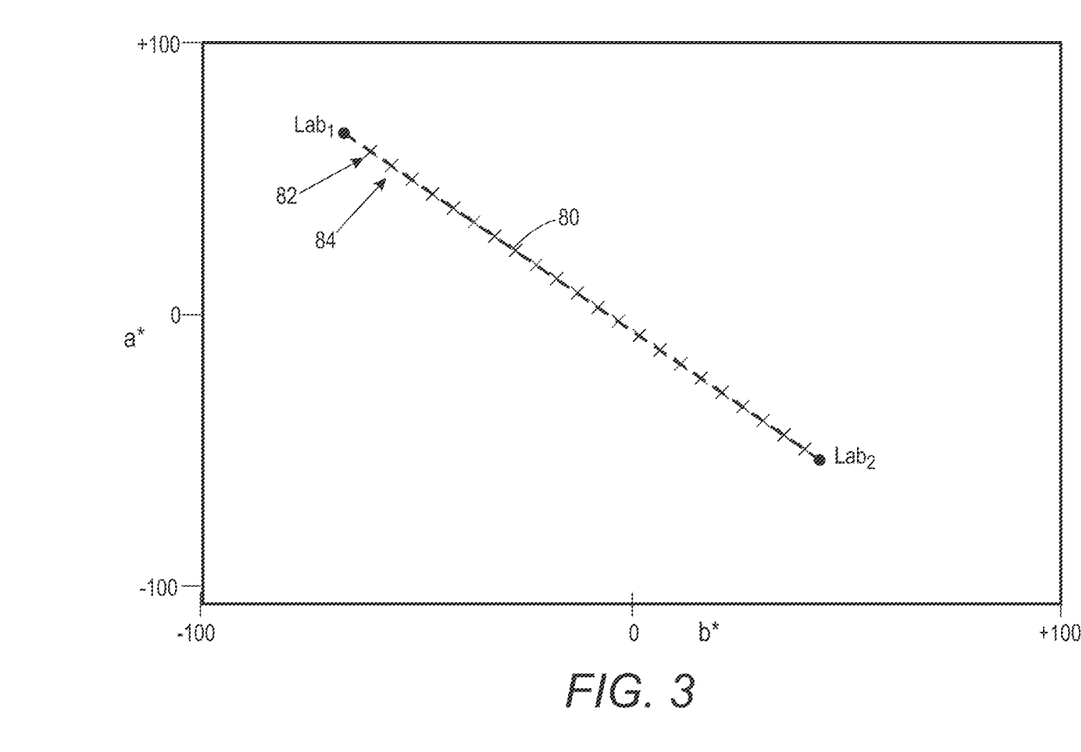
FIG. 3 illustrates an example sweep of points in an input color space.

As graphically illustrated in FIG. 3, the sweep generation component 56 samples a straight line 80 terminated by reference points $Lab_1$ and $Lab_2$. The sampling entails identifying a set of sample points 82, 84, etc., that are spaced along the line 80. Each sample point is identified by a respective vector in the input (e.g., L*a*b*) color space and may be assigned an index, e.g., from 1-100. The sample points may be evenly spaced along the line 80. A sufficient number of sample points is selected to enable discontinuities to be observed in the output color space. For example, at least 50 sample points are selected, such as from 100-256 sample points. The number of sample points selected may be limited, to some degree, by the length of the line 80, i.e., by the number of discrete L*a*b* vectors that can be selected between and including reference points $Lab_1$ and $Lab_2$. In the exemplary embodiment, fewer than all possible discrete vectors along the line are selected as sample points. As will be appreciated, FIG. 3 is intended to be illustrative only and shows only two of the three input dimensions (a* and b*) for ease of illustration.

The color profile application component 58 converts each of the sample points to a corresponding point in the output color space, using the color profile 16. For corresponding points which are considered to be outside the gamut 86 of the printer, these are mapped to points on the perimeter of the gamut.

Figure 4:
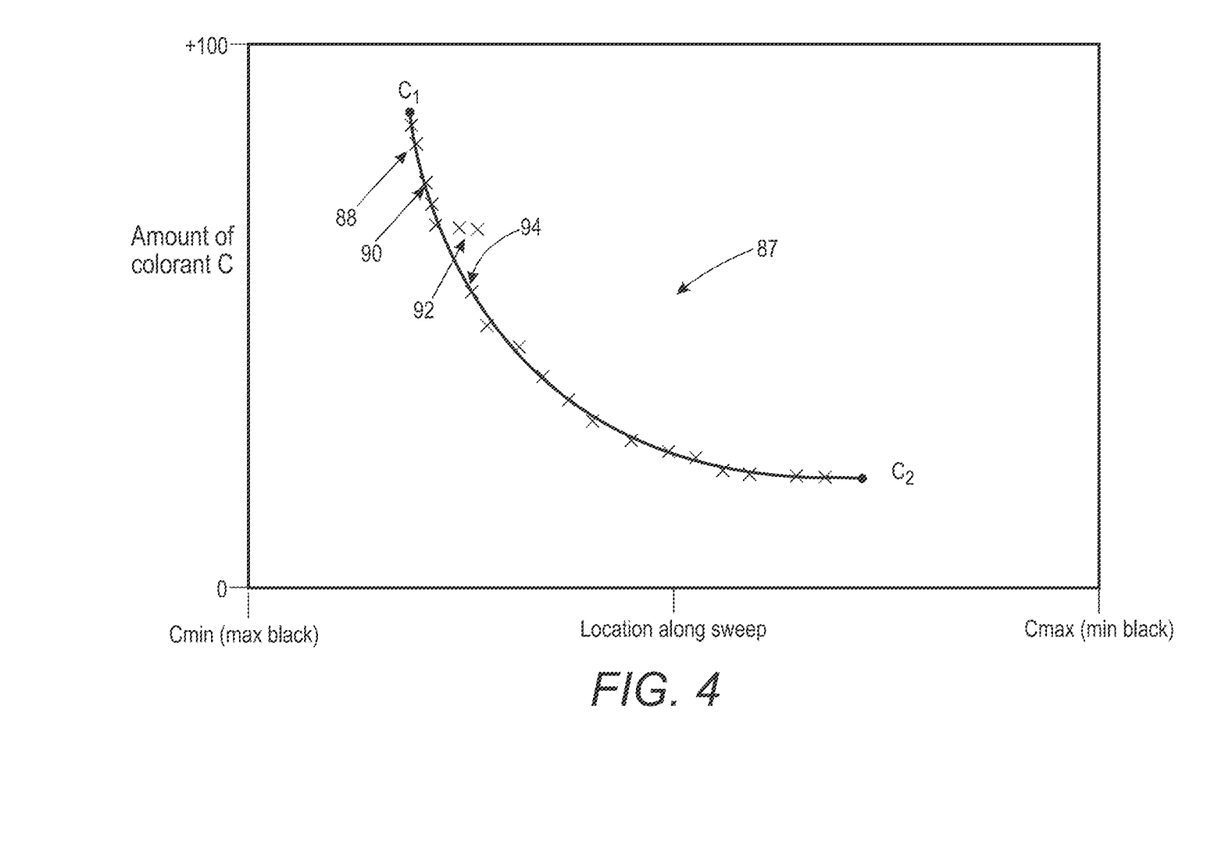
FIG. 4 illustrates an example sweep of points in an output color space for one color separation.

Based on the sample points in the output color space, the plot generation component 60 generates a plot 87 for each color separation which shows the amount of colorant (e.g., on a scale of 1-100) over a range of the index points. For example, point 82 (L*a*b* value) is converted, through the color profile 16, and results in point 88 (CMYK value), where only the C component is shown in plot 87. Similarly, point 84 is converted to point 90, etc. Assuming the samples are taken at equal spacing in the L*a*b* space, the samples 88, 90, etc., can be plotted in sequence on a x-y plot, where x axis is the sampling index, and y axis is the device component value, for example, C.

As shown in FIG. 4, which illustrates the plot 87 for set of corresponding points 88, 90, etc. in the output color space for the output color separation, C, discontinuities 92 may be observed as changes in the gradient. The discontinuities 88 may be identified as regions of the sweep in which a subset of one or more of the points in the output color space diverges from an imaginary curve 94 through at least a neighboring set of points (or all points) by at least a threshold amount. A predetermined threshold τ may be set for identifying a discontinuity, which allows for small variations in the output CMYK values to be accepted (i.e., not a considered as a discontinuity).

The discontinuity detection component 62 determines whether any discontinuities (potential contour artifacts) exist for the selected pair of reference points $Lab_1$, $Lab_2$, e.g., by applying the threshold τ to the sweep of points in the output color space for each color separation. If a discontinuity is detected for any of the color separations, the selected pair of reference points $Lab_1$, $Lab_2$ is identified as having a discontinuity (i.e., a potential contour artifact).

In one embodiment, the detection of discontinuities is performed using a method similar to that described in above-mentioned U.S. Pub. No. 20140254925A1. In the present embodiment, a derivative of each plot 87 may be determined, such as the second derivative. The second derivative follows a substantially straight line when no discontinuities exist. Variations from the straight line, e.g., by more than a threshold amount, are indicative of a discontinuity.

Figure 5:
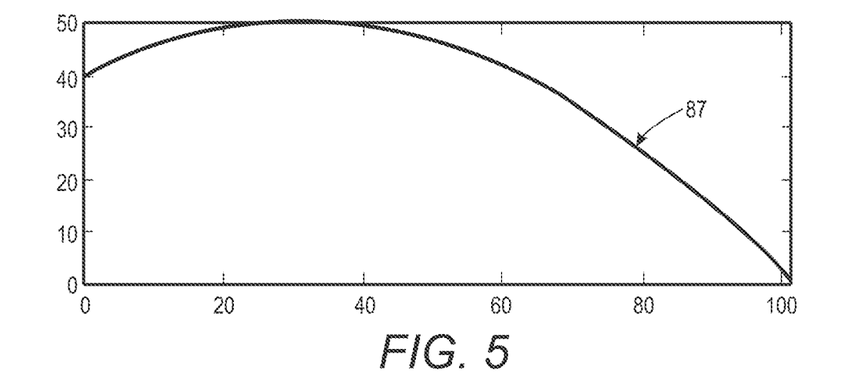
FIG. 5 is an illustrative plot in an output color space for one of the output color separations, C, without discontinuities.
Figure 6:
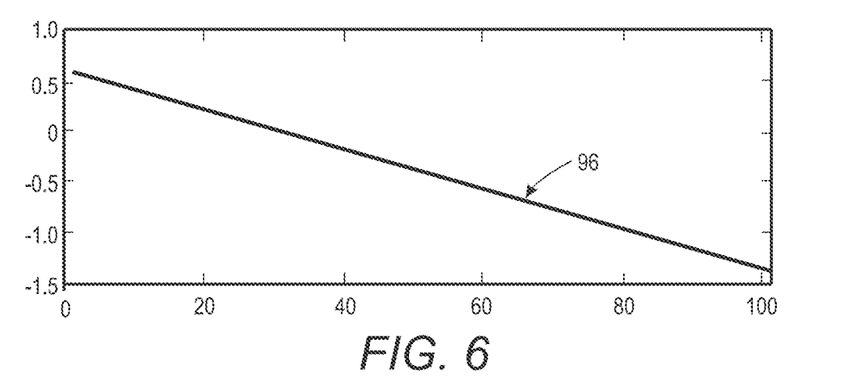
FIG. 6 illustrates the first derivative of the plot of FIG. 5.
Figure 7:
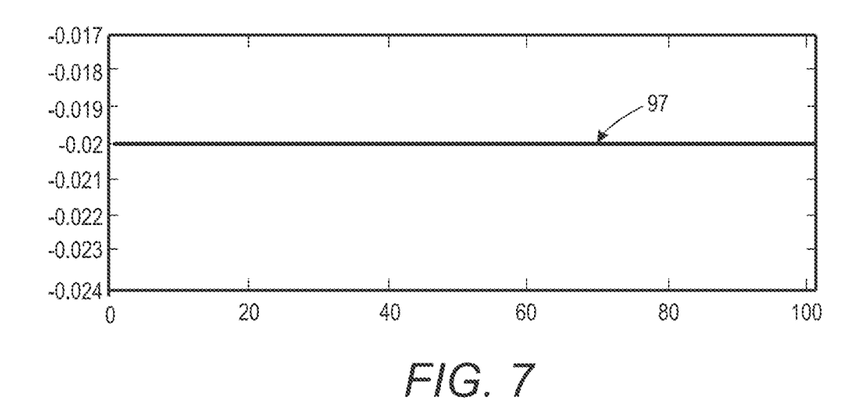
FIG. 7 illustrates the second derivative of the plot of FIG. 5.
Figure 8:
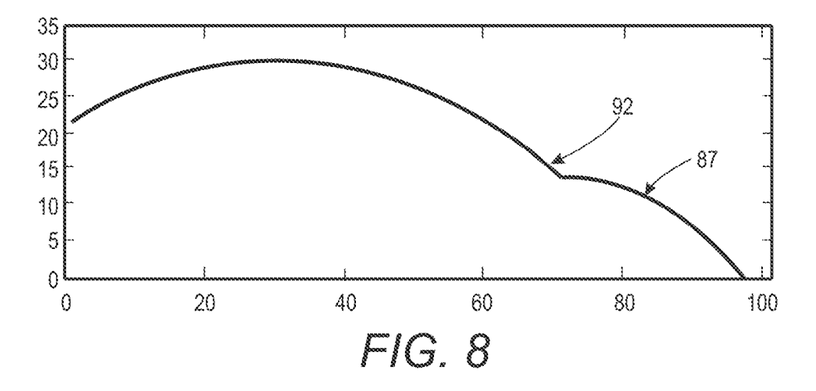
FIG. 8 is an illustrative plot in an output color space for one of the output color separations, C, with a discontinuity.
Figure 9:
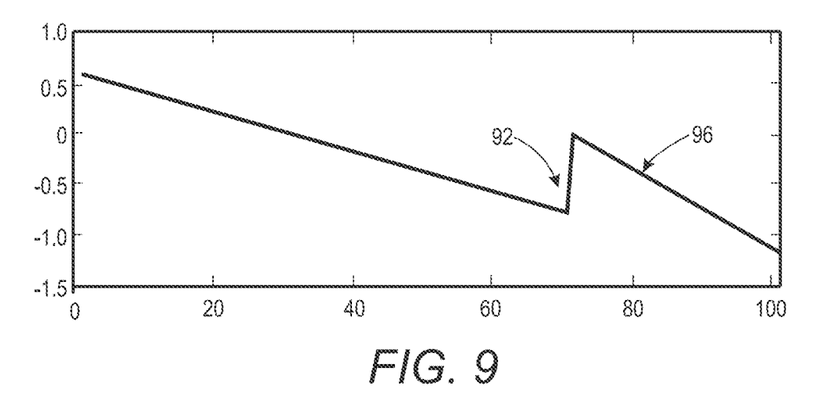
FIG. 9 illustrates the first derivative of the plot of FIG. 8.
Figure 10:
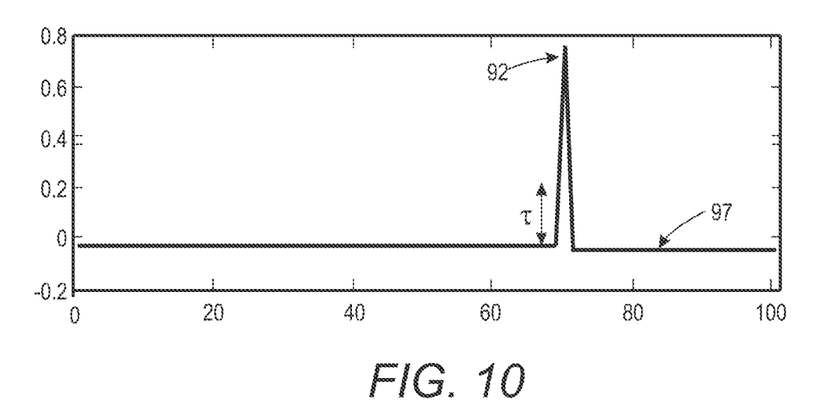
FIG. 10 illustrates the second derivative of the plot of FIG. 8.

As an example, FIGS. 5, 6, and 7 show an illustrative output color component in the sweep, its first derivative 96, and its second derivative 97, respectively, when the curve 87 does not show a discontinuity. In contrast, FIGS. 8, 9, and 10 illustrate the case when there is a discontinuity 92 around the x index =70. The second derivative is usually a clearer indicator of the discontinuity as it more clearly shows a "jump". In the first derivative, the curve 96 usually exhibits some slopes and it may be harder to distinguish a discontinuity from a change in slopes. Using the second derivative to detect the discontinuity, a spike in the second derivative of greater than a threshold height above the adjacent line on one or both sides of the spike may be identified as a discontinuity.

The candidate reference pair selection component 64 stores a candidate set 14 of reference point pairs which includes all or at least some of the pairs of reference points $Lab_1$, $Lab_2$ for which a potential contour artifact is identified, e.g., as a list, table or other data structure. The candidate set 14 may be limited to a predetermined maximum number n of pairs of reference points. For example, the pairs of reference points may be ranked by a measure of the severity of the discontinuities detected and only the n pairs of reference points ranked as most severe are included candidate set 14. In another embodiment, pairs of reference points that meet the threshold are added to the set 14 sequentially until a maximum number is reached and/or until all the selected pairs have evaluated for discontinuities n may be, for example, at least 10, or least 20, or at least 50, or up to 500, or up to 200, or about 100.

Figure 11:
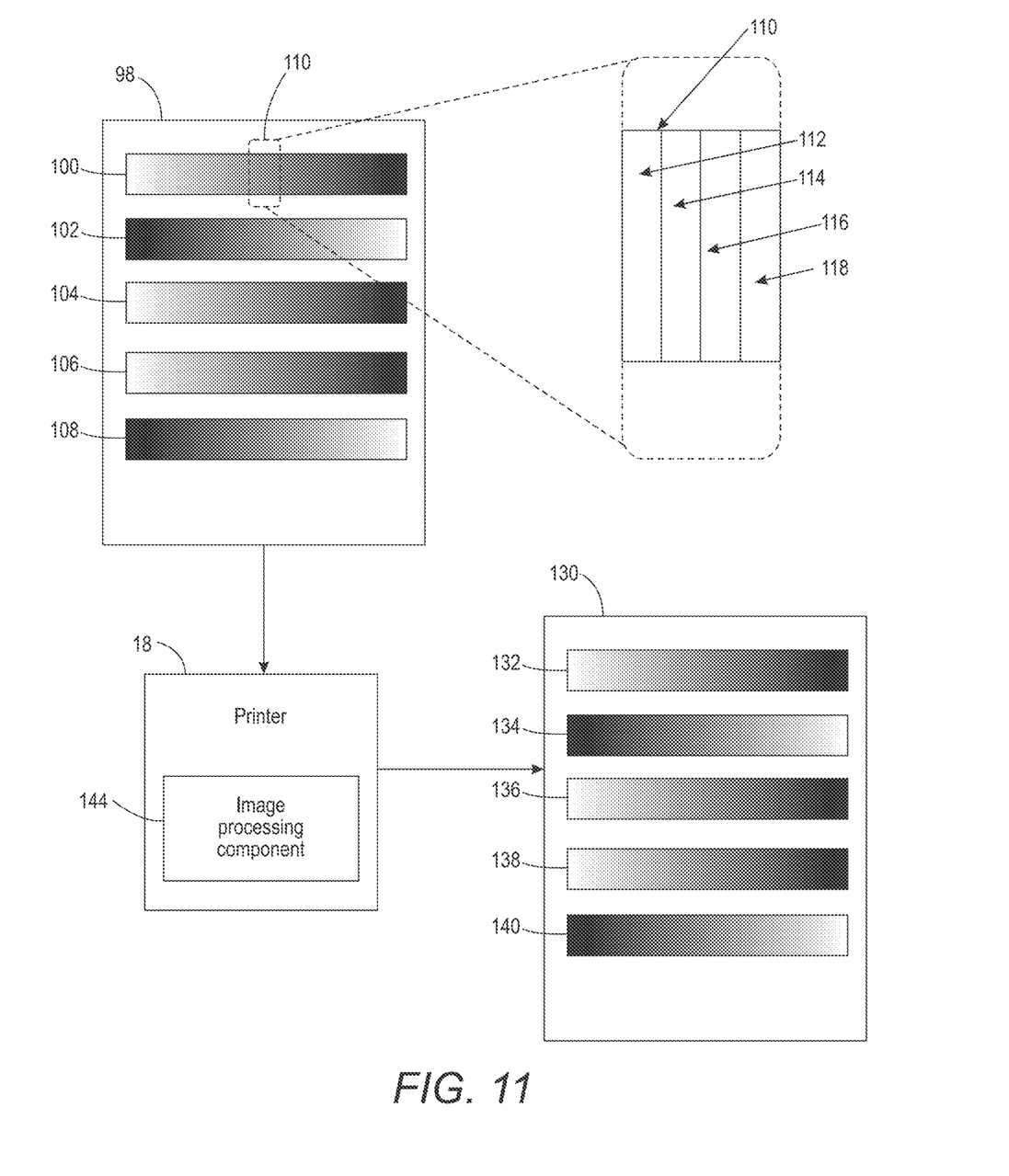
FIG. 11 illustrates digital and printed test images for a set of candidate pairs of reference points.

As illustrated in FIG. 11, the test image generation component 66 generates a test image 98 which includes a set of test sweeps (e.g., as rectangular areas of changing color) 100, 102, 104, 106, 108, each of the test sweeps corresponding to one of the candidate reference point pairs in the set 14 and including the CMYK values for each of the corresponding output points 88, 90, etc., in sequence. FIG. 11 also shows an enlarged portion 110 of one of the test sweeps 100. As will be appreciated, while FIG. 11 illustrates the test sweeps in grey scale, the test sweeps each correspond to a sequence of CMYK vectors, each vector assigned to a respective, equally sized region 112, 114, 116, 118, etc., of the respective color sweep 100 (or to an array of pixels forming the respective region).

Returning to FIG. 1, the test image generation component 66 outputs the test image 98 to the printer 18 for printing. The illustrated printer 18 includes a source 120 of print media sheets 122. Print media sheets are conveyed along a print media path 124 to a marking device 126 (or set of marking devices). The marking device 126 is configured to render an output image on the print media using the set of colorants 20, 22, 24, 26. In an evaluation mode, the printer receives the test image 98 and renders the image 98 on one or more sheets of print media by printing with colorants from the set of colorants. This generates an output test image which includes a set of printed test sweeps. The sheet(s) of paper, with the printed test sweeps thereon, is conveyed along the print media path to an output device 128, such as a tray. An example output image 130 is illustrated in FIG. 11 and includes a set of printed test sweeps 132, 134, 136, 138, 140, etc. (rectangular areas), each corresponding to a respective one of the digital test sweeps 100, 102, 104, 106, 108, etc., in the digital test image 98.

The printed output image 130 is examined to determine whether discontinuities are visually observable in any of the printed test sweeps 132, 134, 136, 138, 140, etc. The printer 18 may include an image processing component 144, which includes software for processing input images prior to printing. For this, and/or other reasons, fewer than all of the printed test sweeps 132, 134, 136, 138, 140, etc., may include visually observable discontinuities. The examination may be performed manually, e.g., by one or more trained human observers, and/or automatically, e.g., by an assessment device 44, such as a full width array scanner with an appropriate processing component. The processing component (not shown) may include hardware and software for detecting discontinuities (contour artifacts) which meet a predetermined threshold, e.g., below which the variations between colors are considered to be not visually detectable (i.e., a human eye would not be expected to notice any discontinuities under normal illumination with the naked eye). In one embodiment, the assessment device 44 may include a classifier, which has been trained on manually-labeled examples of printed test sweeps. The labels for the test sweeps may be selected from at least two labels, such as (0,1), corresponding to no discontinuity/discontinuity, or a larger set of labels, such as (0,1,2), corresponding to no discontinuity/minor discontinuity/minor discontinuity/large discontinuity, or the like. The classifier may probabilistically assign the printed test sweeps one of the labels.

The output image assessment component 68 receives as input, color-related information 148 (e.g., discontinuity-related labels or information from which a discontinuity can be identified, where present) from the assessment device 44 and/or from a human observer, e.g., via the user input device, from which it identifies candidate pairs of reference points in the set 14 for which at least one visually observable discontinuity (contour artifact) has been detected in the respective printed test sweep.

The candidate pair validation component 70 outputs a list 150 of the candidate pairs of reference points that have been determined to have at least one such visually observable discontinuity in the respective printed test sweep. Based on the list 150 of validated reference point pairs, a modified color profile 152 may be developed and input to the evaluation component 12 from a color profile source 154, such as a computing device (e.g., the user device 40 or a different device). The modified color profile 154 may be evaluated in the same manner as the color profile 16. In this evaluation, the previously-generated list 150 of validated reference point pairs may be evaluated, without sampling the line between the reference points.

Figure 12:
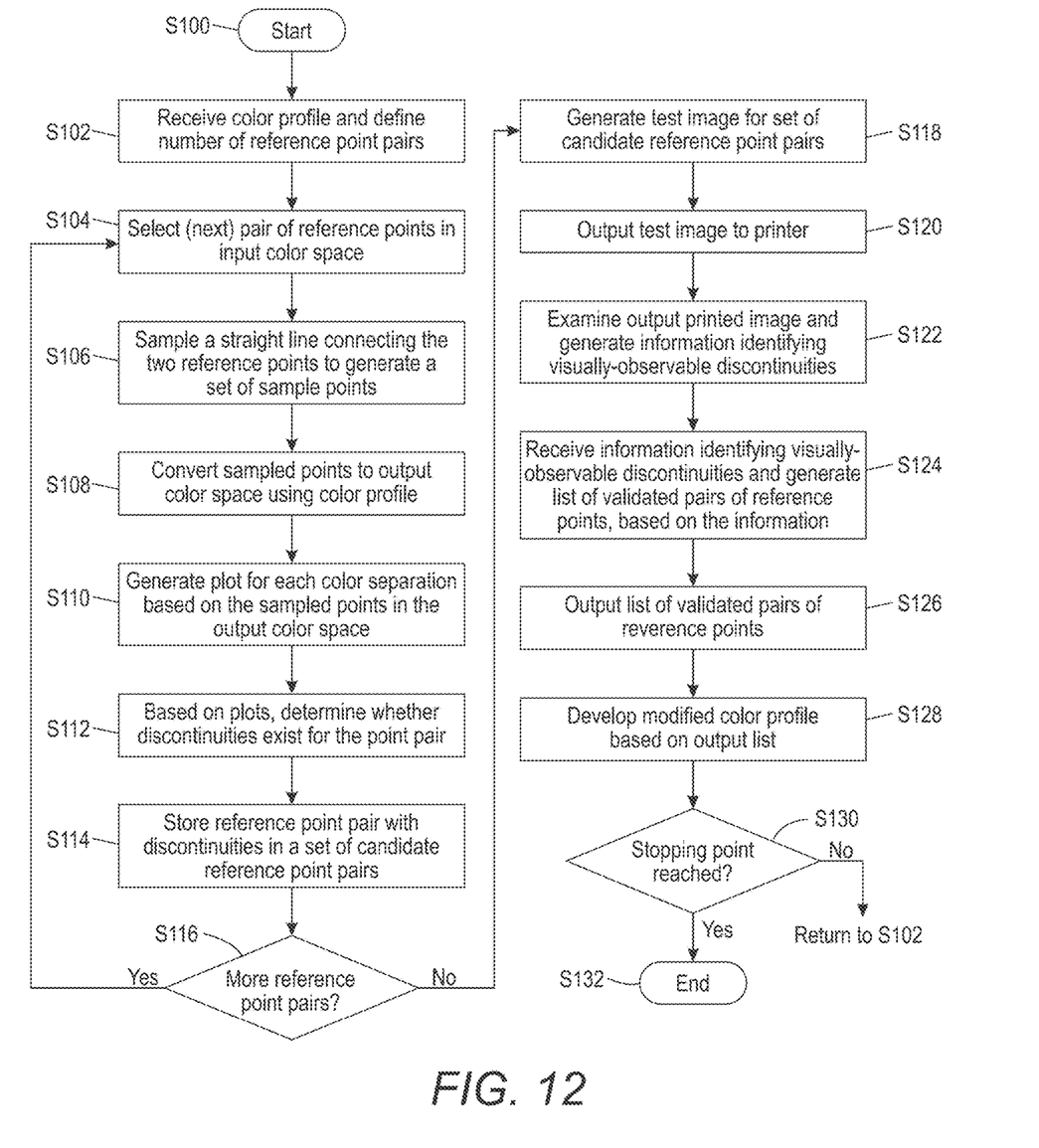
FIG. 12 illustrates an evaluation method in accordance with another aspect of the exemplary embodiment.

FIG. 12 illustrates an evaluation method which can be performed with the system of FIG. 1. Some of the steps of the method may be performed at least partially manually, while others are computer-implemented. The method begins at S100.

At S102, a color profile 16 is input via the input device 36 and stored in memory 30, e.g., by the color profile reception component 52. A predefined number m of reference point pairs to be evaluated may be defined.

At S104, a pair of reference points $Lab_1 = (L^*_1, a^*_1, b^*_1)$ and $Lab_2 = (L^*_2, a^*_2, b^*_2)$ is selected in the input color space, e.g., by the reference point selection component 54. The reference points in the pair may each correspond to a point on the perimeter of the gamut in the output color space. For reference points which are outside the gamut, they may be replaced with a point that corresponds to the nearest point on the gamut perimeter.

At S106, a straight line 80 terminated by reference points $Lab_1$ and $Lab_2$ is sampled, e.g., by the sweep generation component 56. The sampling entails identifying a set of sample points 82, 84, etc., that are spaced along the line 80.

At S108, each of the sample points in the input color space is transformed to a corresponding point within the gamut of the output color space, using the color profile 16, e.g., by the color profile application component 58. The conversion may make use of the profile B2A tags for the printer. The B2A tag is typically related to a Gray Component Replacement (GCR) algorithm, which defines a computation for determining the amount of black (K) colorant to be used when converting L*a*b* values to the output color space, e.g., minimal black, maximal black, and/or an intermediate level. The printer may have several modes which use the different levels of black in printing, since colors close to black can be reproduced by a mixture of the other colorants. If the GCR is not homogeneous throughout the gamut, a discontinuity may occur in the output colorant for a smooth input.

At S110, for each of the C, M, Y, and K color separations, a plot 87 is generated, e.g., by the plot generation component 60, based on the corresponding C, M, Y, and K values computed for the sample points in the sweep.

At S112, by examining each of the plots 87 (the plot itself or a derivative or function thereof) a determination is made, e.g., by the discontinuity detection component 62, as to whether any discontinuities 92 exist for the selected pair of reference points $Lab_1$, $Lab_2$. This may be performed by applying the threshold τ to the sweep of points in the output color space (or to the derivative or function thereof) for each color separation. This may include examining a one dimensional curve in which the y axis defines the amount of color and the x axis corresponds to the location between the two points, e.g., maximum black to maximum cyan in the case of the cyan (C) curve, as illustrated in FIGS. 4, 5, and 8, or examining a first or second derivative of the curve, as illustrated in FIGS. 6-7 and 9-10.

At S114, a candidate set 14 of n reference point pairs is identified and stored, e.g., by the candidate reference point pair selection component 64. The candidate set 14 includes all or at least some of the pairs of reference points $Lab_1$, $Lab_2$ for which a discontinuity has been identified in one or more of the output space curves.

The method proceeds to S116, where if there are any remaining reference point pairs, the method returns to S104, otherwise to S118. Once two reference points have been selected, it is not necessary to select a further pair of reference points which fall on the same line 80.

At S118, a test image 98 is generated, e.g., by the test image generation component 66. The test image 98 includes a set of sweeps 100, 102, 104, 106, 108, each of the sweeps corresponding to one of the candidate reference point pairs in the set 14 and including a contiguous sequence of regions 112, 114, 116, 118, each region being assigned the CMYK values for the corresponding one of the output points 88, 90, etc.

At S120, the test image 98 is output, e.g., by the test image generation component 66, to an associated printer 18 for printing on print media to form printed test sweeps 132, 134, 136, 138, 140, etc.

In the exemplary embodiment, the test image 98 containing the test sweeps is automatically generated and printed to form a printed image 130. In other embodiments, a human operator manually prints the test image.

At S122, the printed output image 130 is examined, manually and/or automatically, to determine whether discontinuities are visually observable in any of the printed test sweeps 132, 134, 136, 138, 140, etc., and to generate information 148 based thereon.

At S124, the information 148 is received, e.g., by the output image assessment component 68, and candidate pairs of reference points in the set 14 for which at least one visually observable discontinuity has been detected in the respective printed test sweep are identified as validated pairs of reference points, based on the information.

At S126, a list 150 of the validated pairs of reference points identified at S124 is output, e.g., by the candidate pair validation component 70.

At S128, a modified color profile 152 may be developed, based on the list 150 of validated reference point pairs, and may be input to the evaluation component 12.

At S130, the method returns to S102, where the modified color profile 152 serves as the color profile 16. The method may proceed through one or more iterations until a stopping point is reached. The stopping point may be determined by the developer of the modified color profile or by the evaluation component, based on stopping point criteria, such as when improvements between one color profile and the next are negligible or undetectable.

The method ends at S132.

The method illustrated in FIG. 12 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the evaluation component 12 or printer 18 (for example, an internal hard drive of RAM), or may be separate (for example, an external hard drive operatively connected with the evaluation component 12), or may be separate and accessed via a digital data network such as a local area network (LAN) or the Internet (for example, as a redundant array of inexpensive or independent disks (RAID) or other network server storage that is indirectly accessed by the system 10, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIG. 12, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

The development of a modified color profile 150 is generally performed by a color development team. Once the development team is satisfied with the color profile, a final image quality review may be performed, e.g., by printing one or more customer images 160 or other suitable test images forming a print job 162 that are received from a print job source 164, such as a client computing device (FIG. 1). The present method facilitates a rapid profile development cycle before calling for a final image quality review.

The method may be repeated, for example, periodically, or when modifications to the printer are made, such as a replacement of the colorants, changes in print media, changes in print speed, temperature within the marking device, and the like.

The automatic contour detection function provided by the illustrated evaluation component 12 may be added in the end of a profile creation tool. Such a tool may assist a user, e.g., via the user device 40, in color profile creation, and send the created color profile to the evaluation component 12 for generating the sweeps and creating a test images for printing.

The software 32 of the automatic evaluation component 12 may implemented as a plug-in in a separate application, such as a color profile creation tool.

The automated contour artifact detection may be implemented as part of a softproof application, where individual output color separations can be examined in a test job 162.

Advantage of the exemplary system and method include some or all of:

An automated prediction of contour artifacts, prior to printing.

The identification of candidate pairs of reference points can be performed without requiring printing and the need for operators to evaluate the printed images, saving time and cost.

The automated identification of candidate pairs of reference points eliminates the human subjective factor during this stage of the method and can offer a more consistent analysis of the color gamut.

The method can effectively cover the printer gamut in a short period of time.

The method enables automatic generation of test images for printing and evaluation.

The method enables issues with a color profile to be identified early, before being provided to customers.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An evaluation method comprising:
   for each of a set of reference point pairs in an input color space:
      sampling a straight line connecting the reference points in the reference point pair to generate a set of sampled points, converting each of the set of sampled points in the input color space to a sampled point in an output color space, and for each of a set of color separations in the output color space, identifying discontinuities, based on the set of sampled points in the output color space; and identifying candidate reference point pairs in the set of reference point pairs for which at least one discontinuity is identified.

2. The method of claim 1, further comprising:

generating a test image, the test image including a sweep for at least some of the candidate reference point pairs, each sweep including at least some of the sampled points in the output color space.

3. The method of claim 2, further comprising:

outputting the test image to an associated printer for printing on print media.

4. The method of claim 3, further comprising:

outputting a list of the reference point pairs, the list including reference point pairs for which a visually observable contouring artifact is detected in the respective test image when printed on the print media.

5. The method of claim 1, further comprising:

receiving a color profile configured for converting each of the set of sampled points in the input color space to the sampled point in an output color space.

6. The method of claim 1, wherein the converting of each of the set of sampled points in the input color space to a sampled point in an output color space comprises applying a color profile to each of the sampled points in the input color space, the color profile converting the sampled point in the input color space to a point in the output color space which is within the color gamut of an associated printer.

7. The method of claim 1, wherein the output color space includes more color separations than the input color space.

8. The method of claim 1, wherein the input color space is a Luminance-Brightness color space.

9. The method of claim 1, wherein the output color space is a CMYK color space.

10. The method of claim 1, wherein the set of reference point pairs includes at least 1000 reference point pairs.

11. The method of claim 1, wherein the sampling includes identifying at least ten sampled points.

12. The method of claim 1, wherein at least some of the reference point pairs in the set of reference point pairs are automatically selected.

13. The method of claim 1, wherein the reference points in each of the reference point pairs correspond to points on a perimeter of a color gamut which defines the output color space.

14. The method of claim 1, wherein the identifying discontinuities comprises, for each of the set of color separations in the output color space, generating a plot of colorant amount over a set of indices, each index corresponding to a point in the input color space.

15. The method of claim 1, further comprising receiving a color modified color profile that has been developed based on the candidate reference point pairs in the set of reference point pairs and repeating the method, wherein the converting each of the set of sampled points in the input color space to a sampled point in an output color space is performed with the modified color profile.

16. An evaluation component comprising memory which stores instructions for performing the method of claim 1 and a hardware processor, in communication with the memory, which executes the instructions.

17. A system comprising the evaluation component of claim 16 and a printer.

18. A computer program product comprising a non-transitory recording medium storing instructions, which when executed on a computer, causes the computer to perform the method of claim 1.

19. An image processing system comprising:

a color profile reception component which receives a color profile;

a reference point pair selection component which selects a set of reference point pairs in an input color space;

a sweep generation component which, for each of the set of reference point pairs in the input color space, samples a straight line connecting the reference points in the reference point pair to generate a set of sampled points;

a color profile application component which applies the color profile to each of the set of sampled points in the input color space to convert the sampled point to a sampled point in an output color space;

a plot generation component which, for each of a set of color separations in the output color space, generates a plot of amount of colorant over a range of mixtures of the colorant;

a discontinuity detection component which identifies discontinuities, based on the plots;

a candidate reference point pair selection component which identifies candidate reference point pairs in the set of reference point pairs for which at least one discontinuity is identified;

a test image generation component which generates a test image, the test image including a test sweep for each of at least some of the candidate reference point pairs, each test sweep including a sequence of regions, each of the regions defining colorant values for a respective point in the sweep of points in the output color space;

an output image assessment component which receives color-related information for a printed image derived from the test image, the color-related information identifying at least one of:

contour artifacts, where present, in the printed test sweeps, and information from which the contour artifacts are identifiable;

a candidate pair validation component which identifies a subset of the candidate reference point pairs as validated reference point pairs, based on the color related information; and a processor which implements the components.

20. The image processing system of claim 19, further comprising:

a printer which prints the printed image based on the test image.

* * * * *